R. PRUGGER.
COIL SUPPORTING DEVICE.
APPLICATION FILED JULY 28, 1917.
1,368,350.
Patented Feb. 15, 1921.
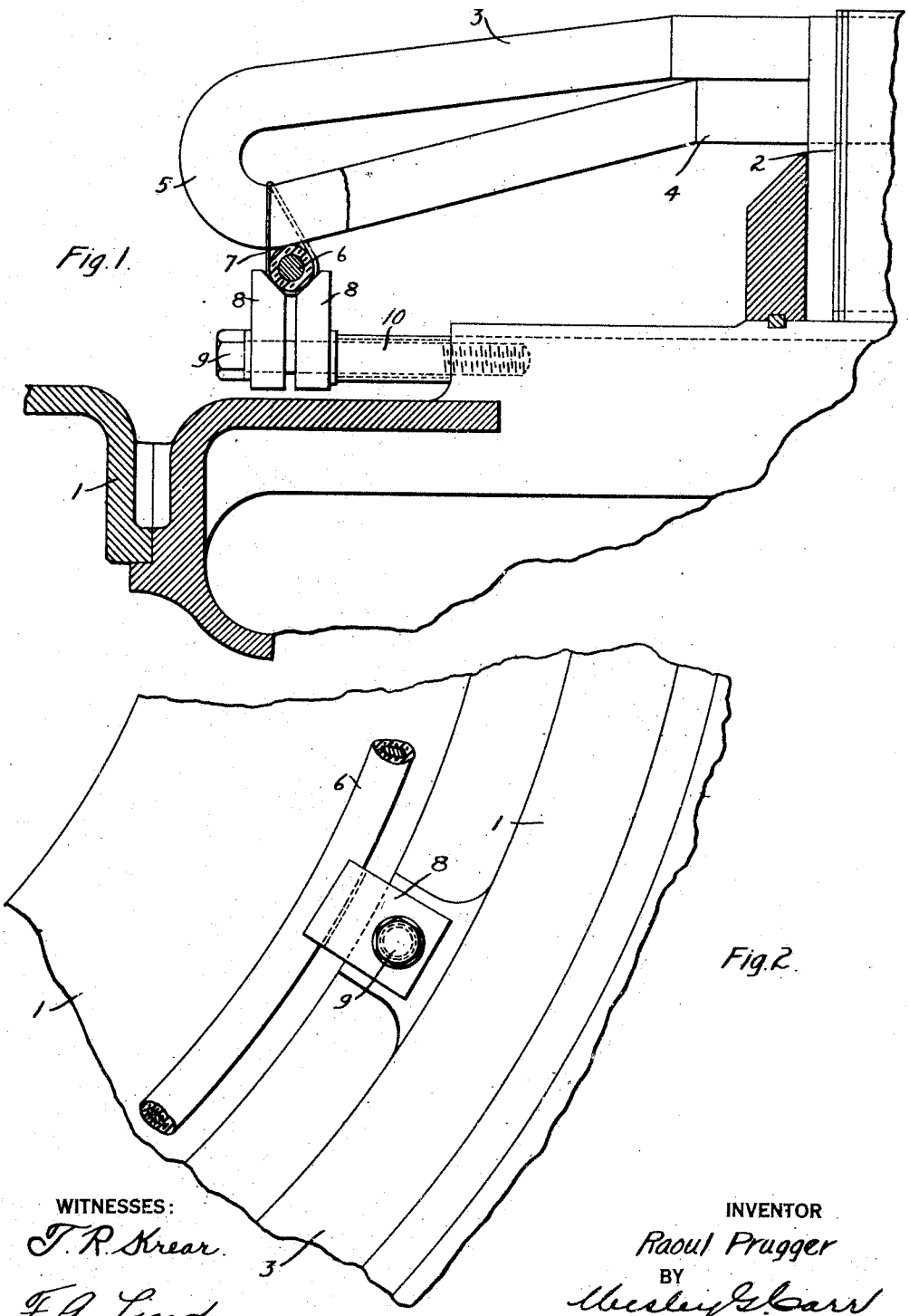
WITNESSES:
T. R. Krear.
F. A. Lind.
INVENTOR
Raoul Prugger
BY
Wesley G. Carr
ATTORNEY

UNITED STATES PATENT OFFICE.

RAOUL PRUGGER, OF IRWIN, PENNSYLVANIA, ASSIGNOR TO WESTINGHOUSE ELECTRIC & MANUFACTURING COMPANY, A CORPORATION OF PENNSYLVANIA.

COIL-SUPPORTING DEVICE.

1,368,350.

Specification of Letters Patent.  Patented Feb. 15, 1921.

Application filed July 28, 1917. Serial No. 183,349.

*To all whom it may concern:*

Be it known that I, RAOUL PRUGGER, a citizen of the United States, and a resident of Irwin, in the county of Westmoreland and State of Pennsylvania, have invented a new and useful Improvement in Coil-Supporting Devices, of which the following is a specification.

My invention relates to dynamo-electric machines and it has special relation to means for supporting the end turns of the windings of such machines.

The object of my invention is to provide a simple and inexpensive device of the character designated by means of which the end turns of the windings shall be held firmly in position and shall be located concentrically with respect to the longitudinal axis of the machine.

My invention is illustrated in the accompanying drawing, in which Figure 1 is a side view, partially in elevation and partially in section, of a portion of a dynamo-electric machine illustrating my invention. Fig. 2 is a fragmentary end view of the apparatus shown in Fig. 1.

It is usual, in constructing a dynamo-electric machine, to provide supporting end members integral with the core structures to which the end portions of the windings are secured. This construction adds considerable weight to the machine and renders the windings inaccessible for repairs. Furthermore, the windings are not open to the cooling action of the ventilating air currents passing through the machine and, therefore, are liable to overheating, often resulting in impairment of the winding. According to my invention, I provide a simple and inexpensive means by which the end portions of the windings are held rigid and in position against the action of forces tending to displace them and are exposed to the cooling action of the ventilating air currents. The coils comprising the winding also may easily be removed for the purpose of repair.

Referring to the accompanying drawing, a dynamo-electric machine is provided with a spider 1 upon which is mounted a slotted core member 2. A winding 3 comprises coils 4 which are located in the slots of the core member 2 and have circumferentially arranged projecting end portions 5. An annular member 6, which is composed of steel or some other suitable rigid material, is located adjacent to the end portions 5 and is secured thereto by banding 7. The member 6 is held in position by a plurality of pairs of coacting wedge-shaped members 8, each pair being mounted on a stud or bar 9 which is in threaded engagement with the spider member 1. A spacing member 10 is mounted on each stud 9 so that, when the studs are screwed into the spider member 1, the respective pairs of wedge-shaped members 8 engage the annular member 6 at several points on its periphery and hold it rigidly in position. The spacing members 10 may be of any suitable length, thereby allowing longitudinal adjustment of the annular member 6.

While I have herein described in detail one application of my invention, I do not wish to be understood as limiting myself to this form or application of said invention. Many modifications and applications of my invention may be made without departing from the spirit and scope of the appended claims.

I claim as my invention:

1. In a dynamo-electric machine, the combination with a core member provided with a winding having an overhanging end portion, of means for positioning said end portion comprising an annular member in engagement with said end portion, a bar extending longitudinally of said core member and mounted on said machine, relatively movable supporting members mounted on said bar and provided with oppositely inclined surfaces, and means for causing said annular member to be fixedly engaged by the inclined surfaces of the supporting members.

2. In a dynamo-electric machine, the combination with a core member mounted upon a supporting spider and provided with a winding having an overhanging end portion, of means for positioning said end portion comprising an annular member attached to said end portion, a stud mounted on said spider, two relatively movable supporting members mounted on said stud and having a portion of their adjacent surfaces oppositely inclined, a spacing sleeve mounted on said stud, intermediate said supporting members and said spider, and means for moving said supporting members toward each other to engage said annular member.

3. In a dynamo-electric machine the combination with a core member mounted upon a supporting spider and provided with a winding having an overhanging end portion, of means for positioning said end portion comprising an annular member attached to said end portion, a threaded stud mounted on said spider, two clamping members loosely mounted on said stud and having a portion of their adjacent surfaces oppositely inclined, said members being moved toward each other when said stud is screwed tightly into said spider.

4. In a dynamo-electric machine, the combination with a core member mounted upon a supporting spider and provided with a winding having an overhanging end portion, of means for positioning said end portion comprising a metallic ring covered with an insulating sleeve and bound to said end portion, a threaded stud mounted on said spider, two clamping members loosely mounted on said stud and having a portion of their adjacent surfaces oppositely inclined, a spacing sleeve mounted on said stud intermediate said clamping members and said spider, said clamping members being moved into engagement with said ring when said stud is screwed into position.

In testimony whereof, I have hereunto subscribed my name this 18th day of July, 1917.

RAOUL PRUGGER.